(12) United States Patent
Aoki et al.

(10) Patent No.: US 6,796,576 B2
(45) Date of Patent: Sep. 28, 2004

(54) OCCUPANT RESTRAINT SYSTEM

(75) Inventors: Takashi Aoki, Saitama (JP); Hidetoshi Utsumi, Saitama (JP); Fumiharu Ochial, Saitama (JP); Naohiko Saita, Saitama (JP); Yuichi Saito, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 20 days.

(21) Appl. No.: 10/164,298

(22) Filed: Jun. 6, 2002

(65) Prior Publication Data

US 2003/0006589 A1 Jan. 9, 2003

(30) Foreign Application Priority Data

Jun. 11, 2001 (JP) .................................... 2001-175068

(51) Int. Cl.[7] ............................................. B60R 21/22
(52) U.S. Cl. .................................................. 280/730.2
(58) Field of Search ..................................... 280/730.2

(56) References Cited

U.S. PATENT DOCUMENTS

| | | | | |
|---|---|---|---|---|
| 4,325,268 A | * | 4/1982 | Benteler et al. | 74/492 |
| 6,299,199 B1 | * | 10/2001 | Bowers et al. | 280/730.2 |
| 6,530,594 B1 | * | 3/2003 | Nakajima et al. | 280/730.2 |
| 6,530,595 B2 | * | 3/2003 | Masuda et al. | 280/730.2 |
| 6,554,314 B1 | * | 4/2003 | Uchiyama et al. | 280/730.2 |
| RE38,125 E | * | 5/2003 | Shibata et al. | 280/730.2 |
| 6,575,496 B2 | * | 6/2003 | Hess et al. | 280/730.2 |
| 6,595,546 B2 | * | 7/2003 | Smith | 280/736 |
| 2001/0000290 A1 | * | 4/2001 | Nakajima et al. | 280/730.2 |

FOREIGN PATENT DOCUMENTS

| JP | 11-235965 | 8/1999 |
|---|---|---|
| JP | 2000-033847 | 2/2000 |

* cited by examiner

*Primary Examiner*—Charles T. Jordan
*Assistant Examiner*—Bret Hayes
(74) *Attorney, Agent, or Firm*—Carrier, Blackman & Associates, P.C.; Joseph P. Carrier; William D. Blackman

(57) ABSTRACT

An occupant restraint system includes an airbag and an inflator. An impact absorbing member is disposed at an upper part of the folded airbag, which is disposed along a roof side rail, at positions other than that of a center pillar, and an impact absorbing member is disposed at a lower part of the folded airbag at the position of the center pillar. This arrangement ensures that there is a distance between the airbag and the upper end of a center pillar garnish, thereby making it difficult for the deploying airbag to catch on the upper end of the garnish, and the impact absorbing member can guide the deploying airbag toward the occupant compartment, thereby more reliably preventing it from catching on the upper end of the garnish.

10 Claims, 12 Drawing Sheets

OCCUPANT RESTRAINT SYSTEM

BACKGROUND OF THE INVENTION

1. Field of the Invention

The present invention relates to an occupant restraint system in which a side airbag is disposed in a folded state along an upper edge of a door opening of a vehicle body, and the airbag is inflatable by a gas generated by an inflator when the vehicle is involved in a collision. Upon activation, the side airbag is deployed in a curtain shape along the inner face of a side of an occupant compartment.

2. The Relevant Art

Conventionally, such an occupant restraint system is known in, for example, Japanese Patent Application Laid-open Nos. 2000-33847 and 11-235965. It is also known that, in order to absorb the impact of a secondary collision of an occupant against a roof side rail when the vehicle is involved in a light collision where the airbag of the occupant restraint system does not deploy, an impact absorbing member is disposed along an upper part of the folded airbag.

When the folded airbag deploys downward from the roof side rail, the airbag can deploy smoothly along the door glass of a front door and the door glass of a rear door. However, since a center pillar projects inwardly beyond the inner face of the door glass of the occupant compartment, there is a possibility that the airbag might catch on the upper end of a pillar garnish of the center pillar, thereby preventing smooth deployment of the airbag.

The present invention has been carried out in view of the above-mentioned circumstances, and it is an object of the present invention to prevent a deploying airbag from catching on the upper end of a pillar garnish by employing an impact absorbing member disposed along the folded airbag.

SUMMARY OF THE INVENTION

In order to achieve the above-mentioned object, a first aspect of the present invention proposes an occupant restraint system that includes an airbag that is disposed in a folded state along an upper edge of a door opening of a vehicle body, and an inflator that is operable to generate a gas when the vehicle is involved in a collision. When activated, the gas inflates the airbag so that it is deployed in a curtain shape along the inner face of a side of an occupant compartment. In the practice of the present invention, an impact absorbing member is disposed along the folded airbag, and the impact absorbing member is disposed at a lower part of the airbag in the vicinity of the pillar garnish of at least one pillar.

In accordance with the above-mentioned arrangement, the impact absorbing members disposed at an upper part of and at the lower part of the folded airbag can help protect the head of an occupant from the impact of a secondary collision, when the vehicle is involved in a light collision where the airbag does not deploy. Furthermore, since the impact absorbing member is disposed at the lower part of the airbag in the vicinity of the pillar garnish, it is possible to ensure that there is a distance between the airbag and the upper end of the pillar garnish. This arrangement makes it difficult for the deploying airbag to catch on the upper end of the pillar garnish and, moreover, the impact absorbing member can guide the deploying airbag toward the occupant compartment, thereby more reliably preventing the airbag from catching on the upper end of the pillar garnish.

The pillar of the present invention corresponds to a center pillar 12 in an embodiment, and the pillar garnish of the present invention corresponds to a center pillar garnish 53 in the embodiment.

Modes for carrying out the present invention are explained below by reference to an embodiment of the present invention shown in the attached drawings.

BRIEF DESCRIPTION OF THE DRAWINGS

FIG. 1 is a perspective view showing the interior of an occupant compartment of an automobile.

FIG. 2 is a view corresponding to FIG. 1, showing a state in which an airbag of an occupant restraint system has been deployed.

FIG. 3 is a magnified view of the occupant restraint system in which the airbag has been deployed.

FIG. 4 is an exploded perspective view of the occupant restraint system.

FIG. 5 is a magnified cross section along line 5—5 of FIG. 1.

FIG. 6 is a magnified cross section along line 6—6 of FIG. 1.

FIG. 7 is a magnified cross section along line 7—7 of FIG. 1.

FIG. 8 is a magnified cross section along line 8—8 of FIG. 1.

FIG. 9 is a magnified cross section along line 9—9 of FIG. 3.

FIG. 10 is a magnified cross section along line 10—10 of FIG. 5.

FIG. 11 is a view from arrow 11 of FIG. 4.

FIG. 12 is a view from arrow 12 of FIG. 7.

DESCRIPTION OF PREFERRED EMBODIMENT

Figure 1:
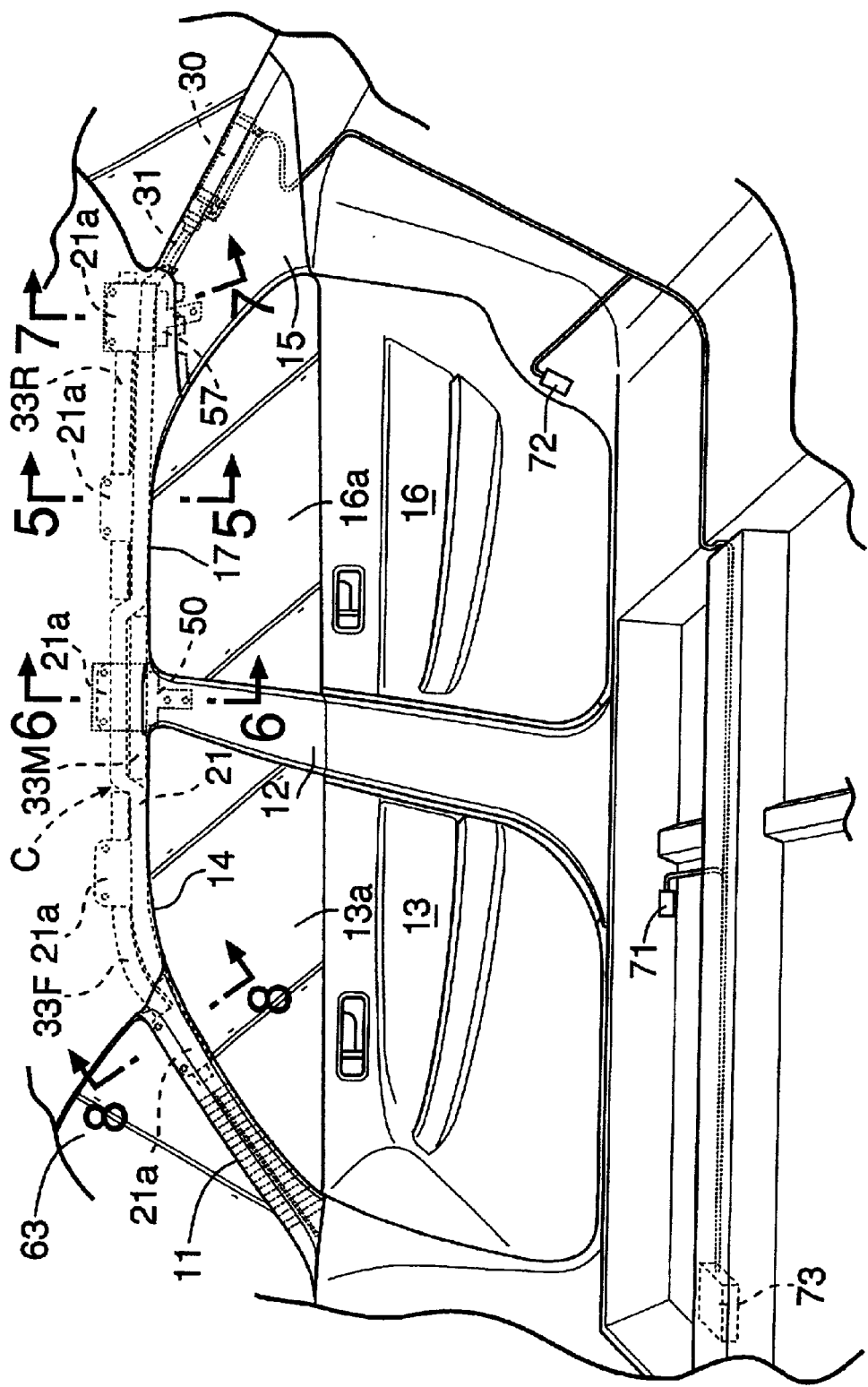
FIGS. 1 to 12 shows one embodiment of the present invention.

Referring to FIG. 1, formed between a front pillar 11 and a center pillar 12 on a vehicle body side face is a door opening 14 in which a front door 13 is mounted, and formed between the center pillar 12 and a rear pillar 15 is a door opening 17 in which a rear door 16 is mounted. A roof side rail 18 (see FIG. 5) extends in the longitudinal direction of the vehicle body, so as to provide a connection between the upper end of the front pillar 11 and the upper end of the rear pillar 15. The roof side rail 18 defines the upper edges of the door openings 14 and 17 of the front door 13 and the rear door 16. An occupant restraint system C is provided along the roof side rail 18. The occupant restraint system C is provided on each of the left and right sides of the vehicle body. The two sides of the vehicle have a substantially identical mirror-image structure, and that provided on the right side of the vehicle body is explained below as being representative thereof.

Figure 2:
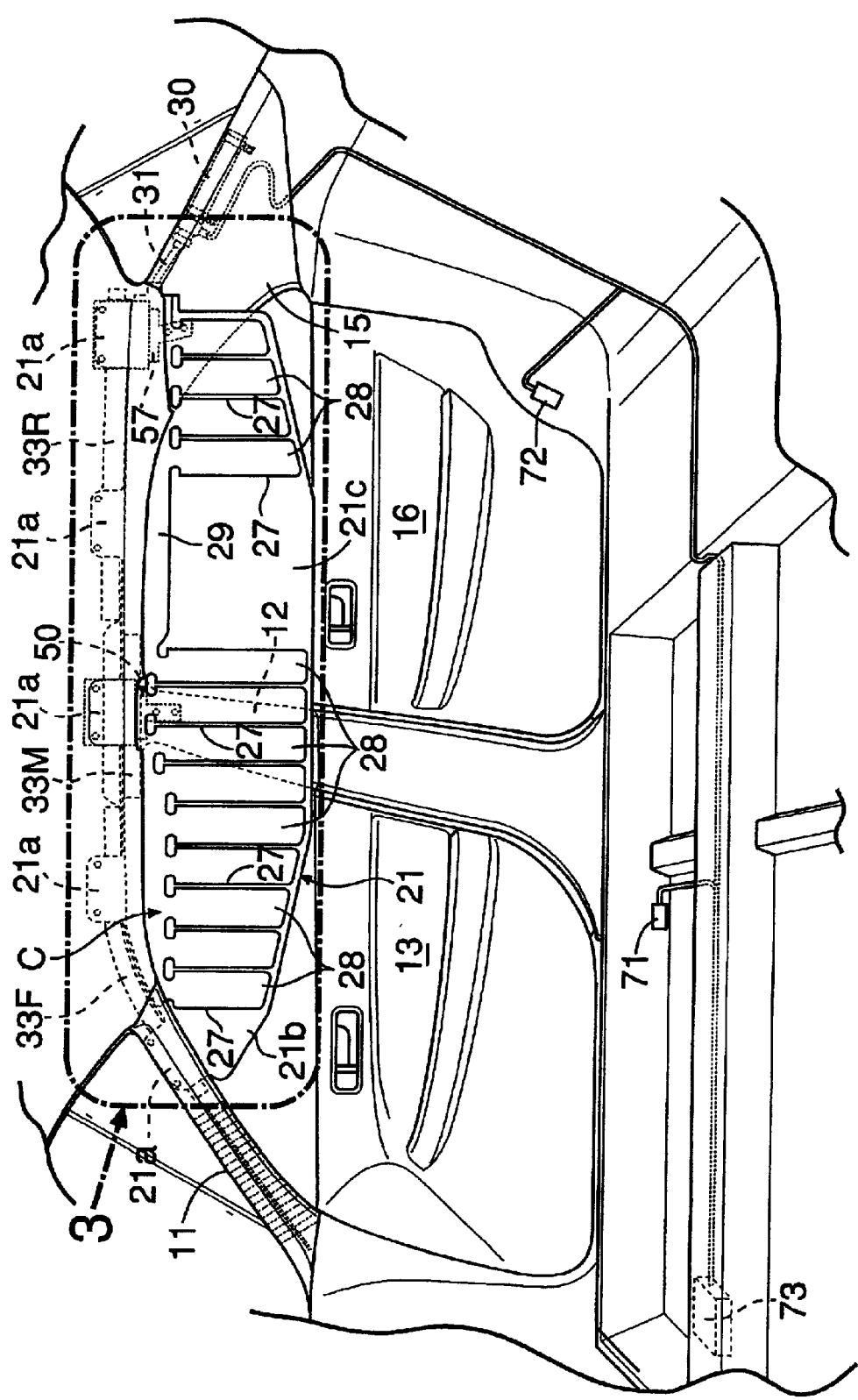

Turning to FIG. 2, when an acceleration equal to or greater than a predetermined value is detected when the vehicle is involved in a side collision or a rollover, an airbag 21 of the occupant restraint system C is deployed downward in a curtain shape from the upper edges of the door openings 14 and 17. The deployed air bag substantially covers the inner side face of the vehicle, so as to block occupants seated in front and rear seats from impacting against the inner side face of the vehicle body, that is to say, the front pillar 11, the center pillar 12, the rear pillar 15, a door glass 13a of the front door 13, and/or a door glass 16a of the rear door 16.

Figure 3:
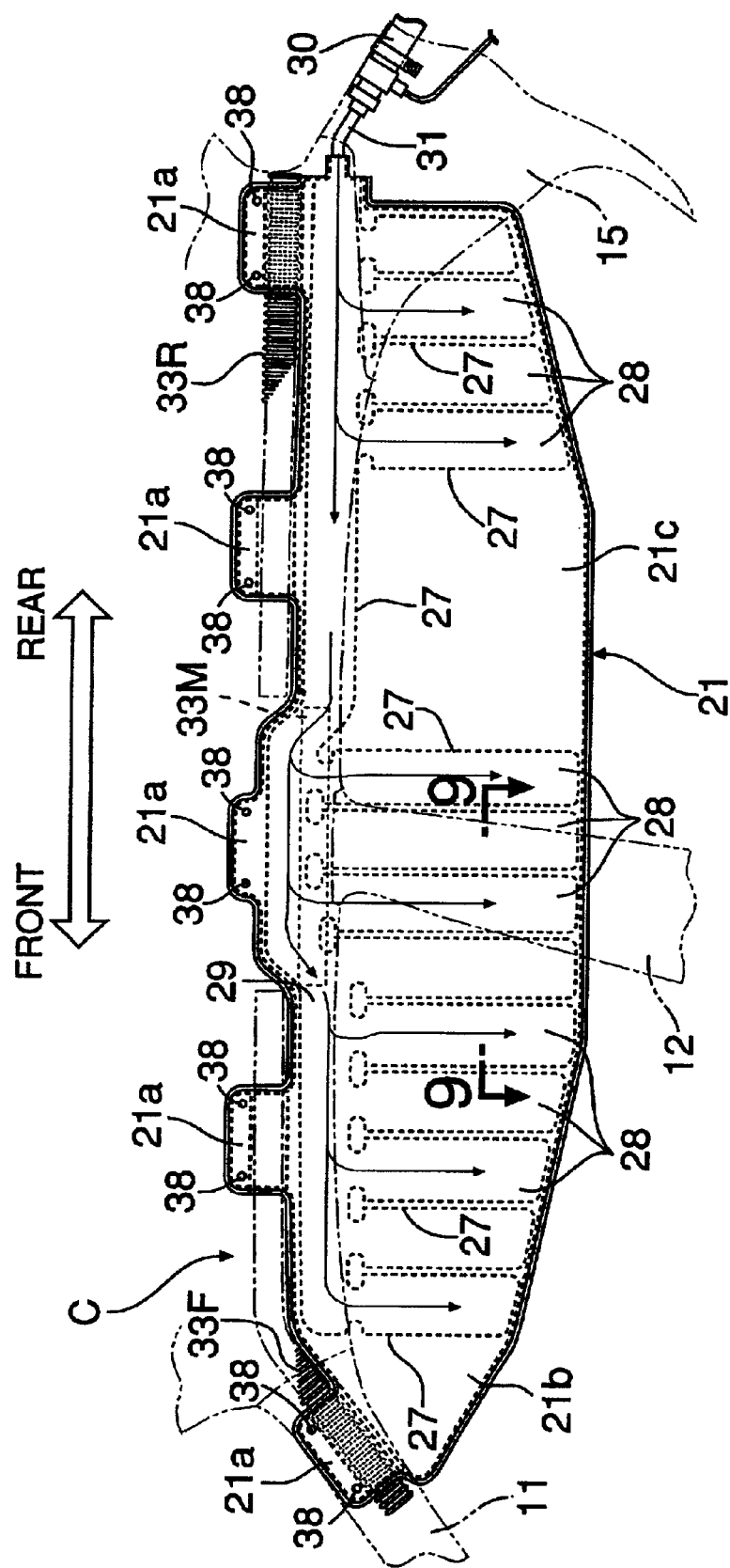
Figure 9:
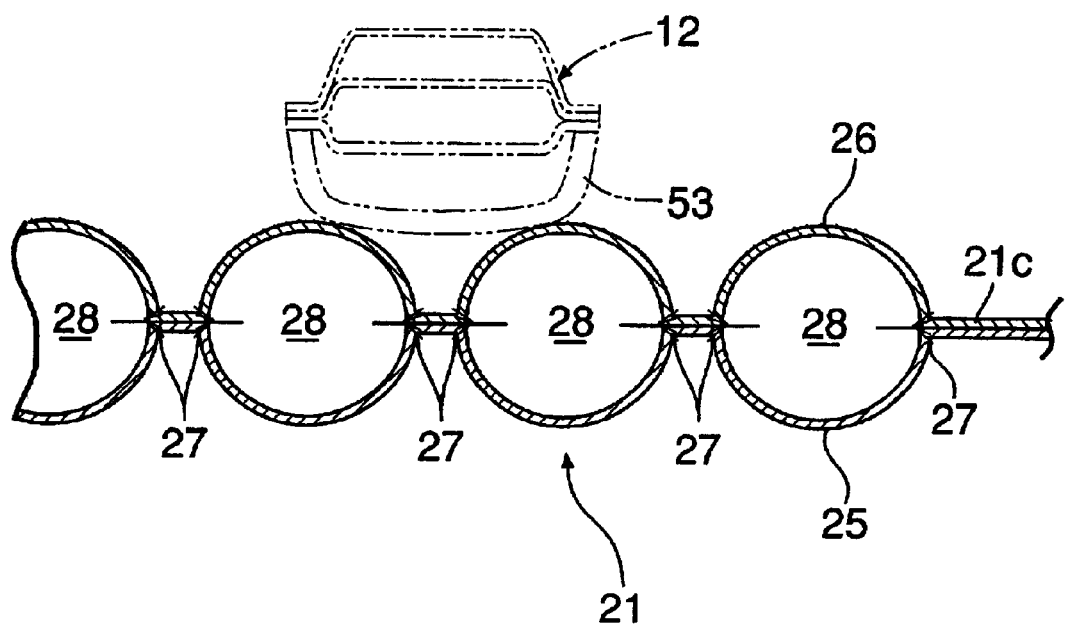

As shown in FIG. 3, the airbag 21 extending in the longitudinal direction of the vehicle body is formed by sewing with stitching 27 a first base fabric 25 and a second base fabric 26 superimposed one on top of the other, the two having substantially the same shape (see FIG. 9). The stitching 27 forms a plurality of (for example, thirteen) cells 28, and an upper communicating passage 29. The front end of a gas supply pipe 31, extending forward from an inflator 30 housed within the rear pillar 15, is inserted within the upper communicating passage 29. The lower ends of the thirteen cells 28 branching downward from the upper communicating passage 29 are blocked. The part via which the gas supply pipe 31 is inserted within the upper communicating passage 29 is fixed by means of a metal band, etc. and is sealed so that the gas cannot leak.

Positions of the airbag 21 that correspond to the rear side of the front pillar 11 and the rear side of the center pillar 12 are provided with non-inflatable sections 21b and 21c where no cells 28 are formed.

Figure 10:
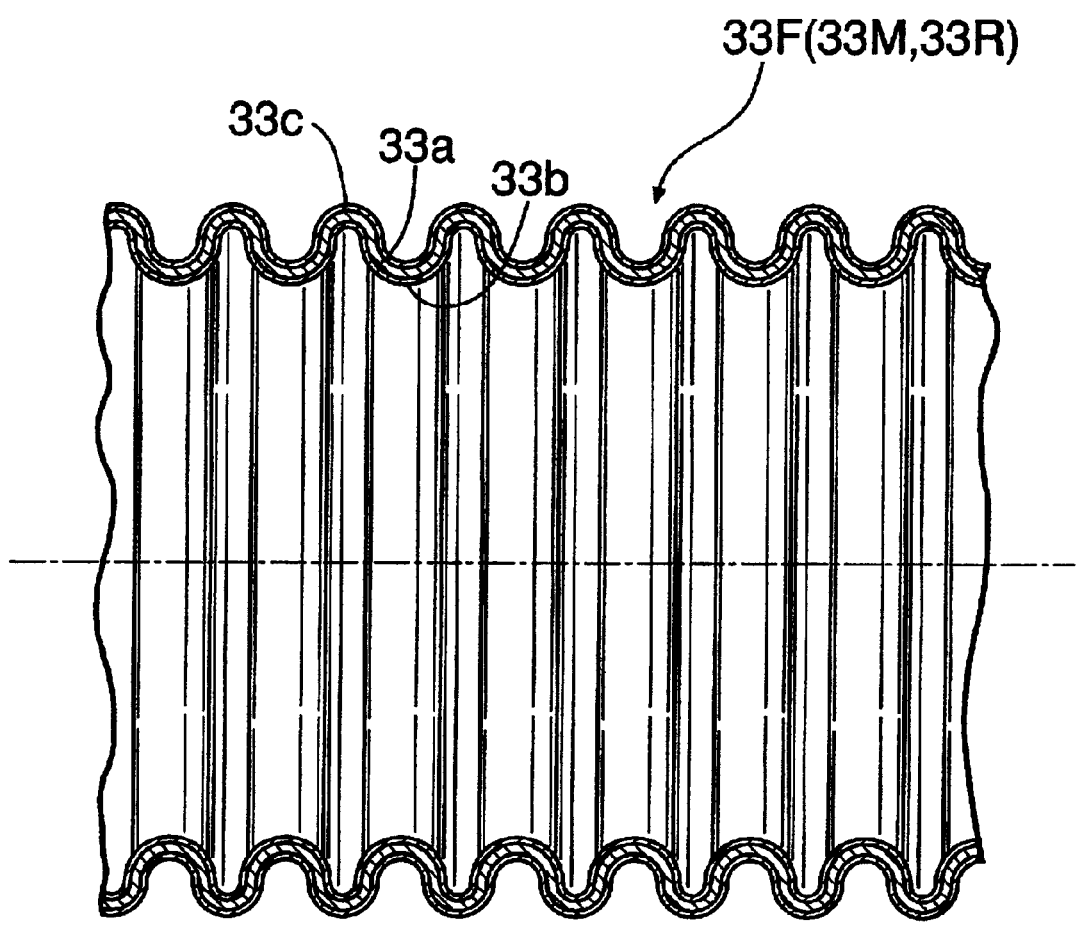

Provided along the upper edge of the airbag 21 are a plurality of (for example, six) supports 21a and 21a'. Three impact absorbing members 33F, 33M, and 33R, which are three separate corrugated pipes, are integrated with the airbag 21 by means of the supports 21a and 21a'. As shown in FIG. 10, the impact absorbing members 33F, 33M and 33R are formed into bellows having a circular cross section by laminating a middle main body 33a made of aluminum and inner and outer coverings 33b and 33c made of paper, and they can be made to collapse by an external load, thereby exhibiting an effective impact-absorbing effect.

Referring to FIGS. 3 to 7, a roof 34 is formed from an outer member 35, a center member 36, and an inner member 37, and the front pillar 11 is formed from an outer member 39, a center member 40, and an inner member 41. The impact absorbing member 33F on the front side is fixed, along the upper part of the folded airbag 21, to the inner member 41 of the front pillar 11 and the inner member 37 of the roof 34 by bolts 38, two of which pass through each of the first and second (from the front) supports 21a, which are integral with the airbag 21.

The impact absorbing member 33M in the middle is supported by the support 21a' (FIG. 4), which is separate from the airbag 21, and is fixed, together with the third (from the front) support 21a of the airbag 21, to the inner member 37 of the roof 34 by two bolts 38 along the lower part of the folded airbag 21. The impact absorbing member 33R on the rear side is fixed, along the upper part of the folded airbag 21, to the inner member 37 of the roof 34 by bolts 38, two of which pass through each of the fourth and fifth (from the front) supports 21a, which are integral with the airbag 21.

Since the folded airbag 21 and the impact absorbing members 33F, 33M and 33R are integrated in advance to form a module in this way, the mounting operation therefor becomes easy in comparison with a case where they are individually mounted in the vehicle body, thereby enhancing the operational efficiency and the precision of assembly. Moreover, since both the folded airbag 21 and the corrugated pipe impact absorbing members 33F, 33M and 33R are flexible, they can be placed easily along the curved roof side rail 18.

Figure 4:
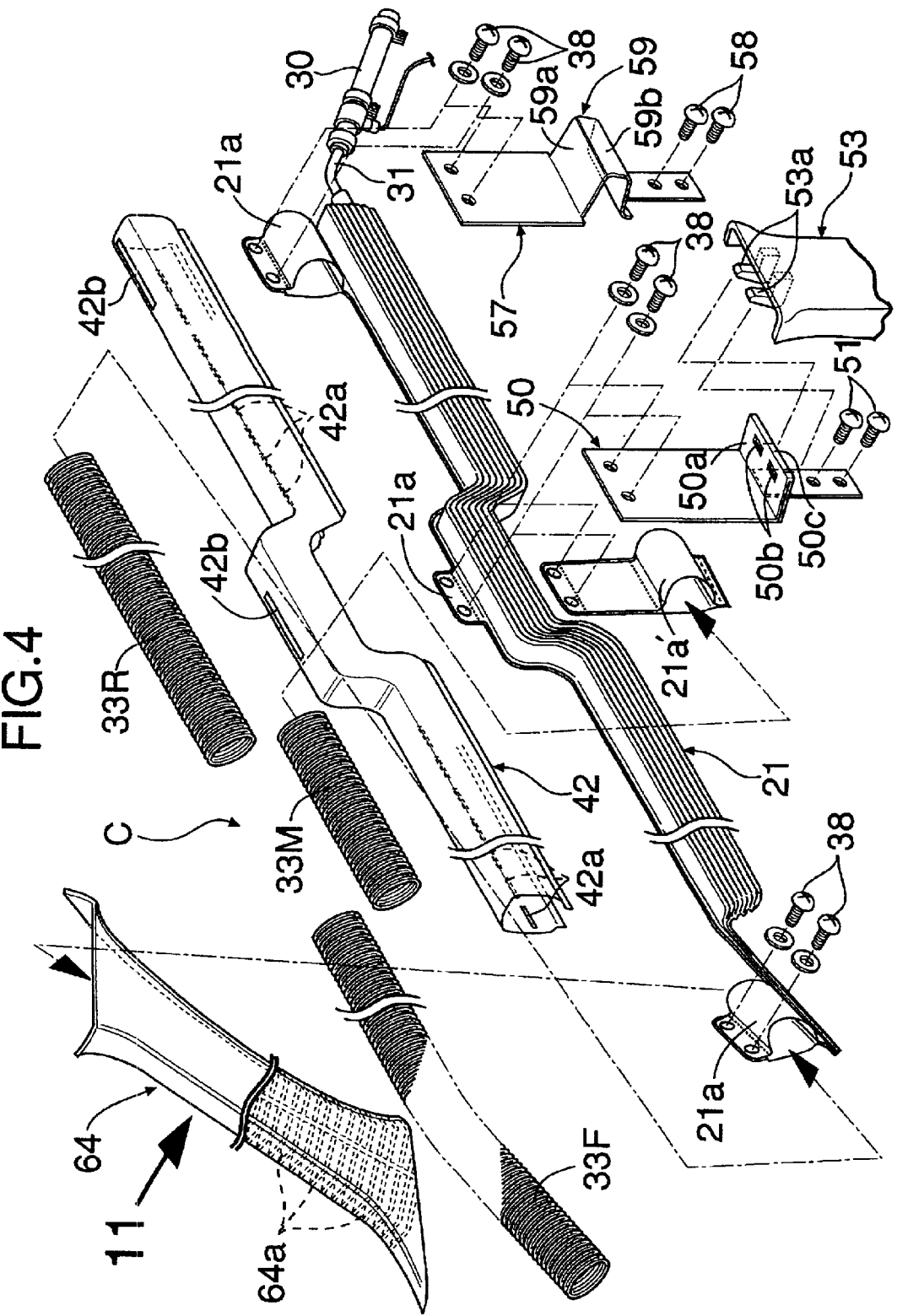

As is clear from FIG. 4, the folded airbag 21 is housed within an airbag cover 42 formed from a nonwoven fabric. The airbag cover 42 is made by sewing along the lower edges of a tube formed from a rectangular piece of cloth, and includes, on the side facing the roof side rail 18, perforation slits 42a that can be ruptured easily. The supports 21a projecting from the upper end of the airbag 21 pass through openings 42b formed on the upper face of the airbag cover 42, and project upwardly therefrom.

Figure 5:
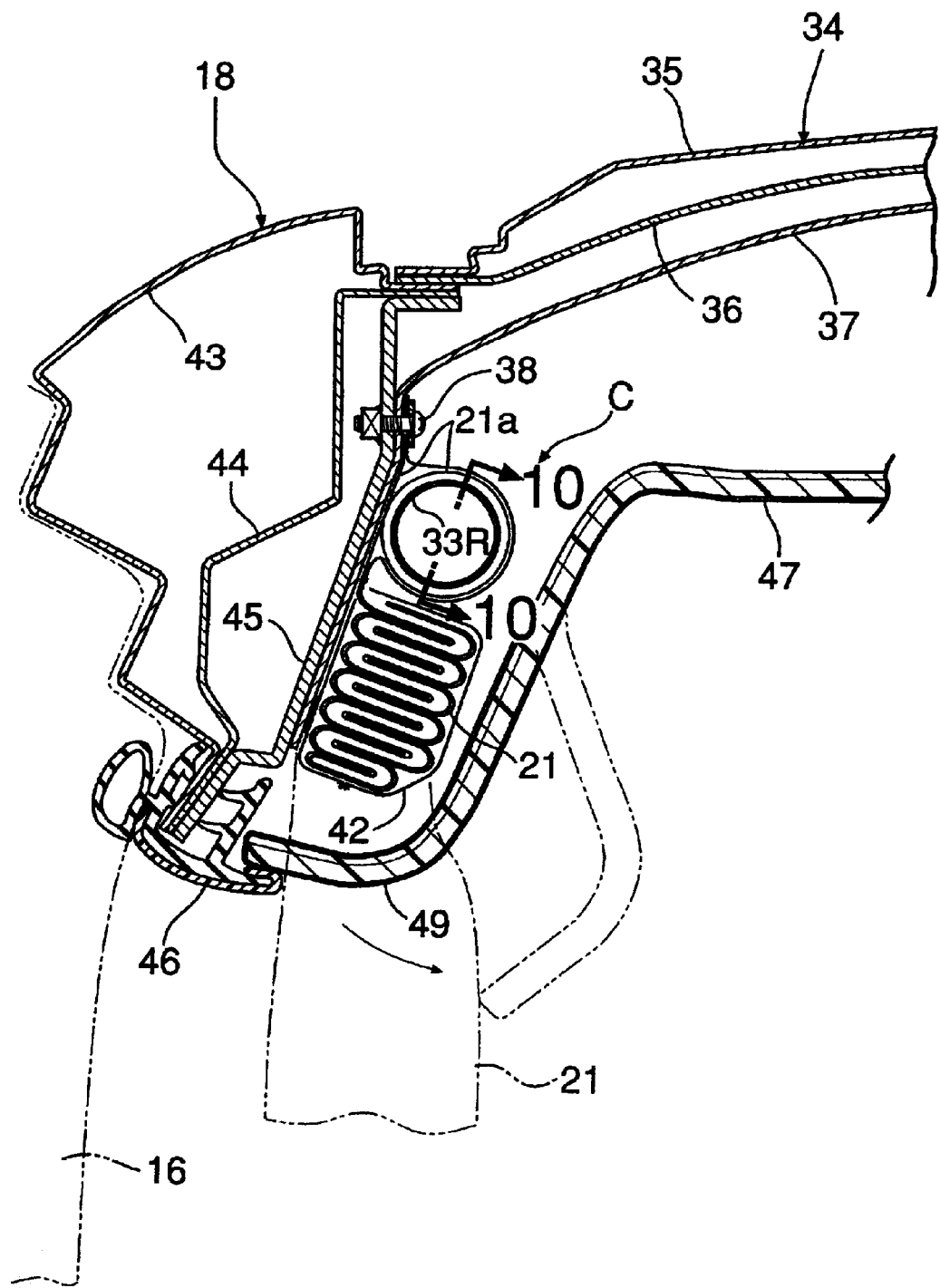

As is clear from FIG. 5, provided on the lower end of the roof side rail 18 formed from an outer member 43, a center member 44, and an inner member 45 is a weather strip 46 that can make contact with the rear door 16 (or the front door 13). The edge of a synthetic resin roof garnish 47 positioned along the lower face of the roof 34 latches on the edge of the weather strip 46 projecting from the lower end of the roof side rail 18 toward the occupant compartment. The occupant compartment-facing lower face of the roof garnish 47 is covered with a skin material 49, and this skin material 49 is wrapped around the edge of the roof garnish 47 from the lower face side to the upper face side. It is possible thereby to prevent the edge of the synthetic resin roof garnish 47 from splitting and shattering when it is exposed to an impact.

Figure 6:
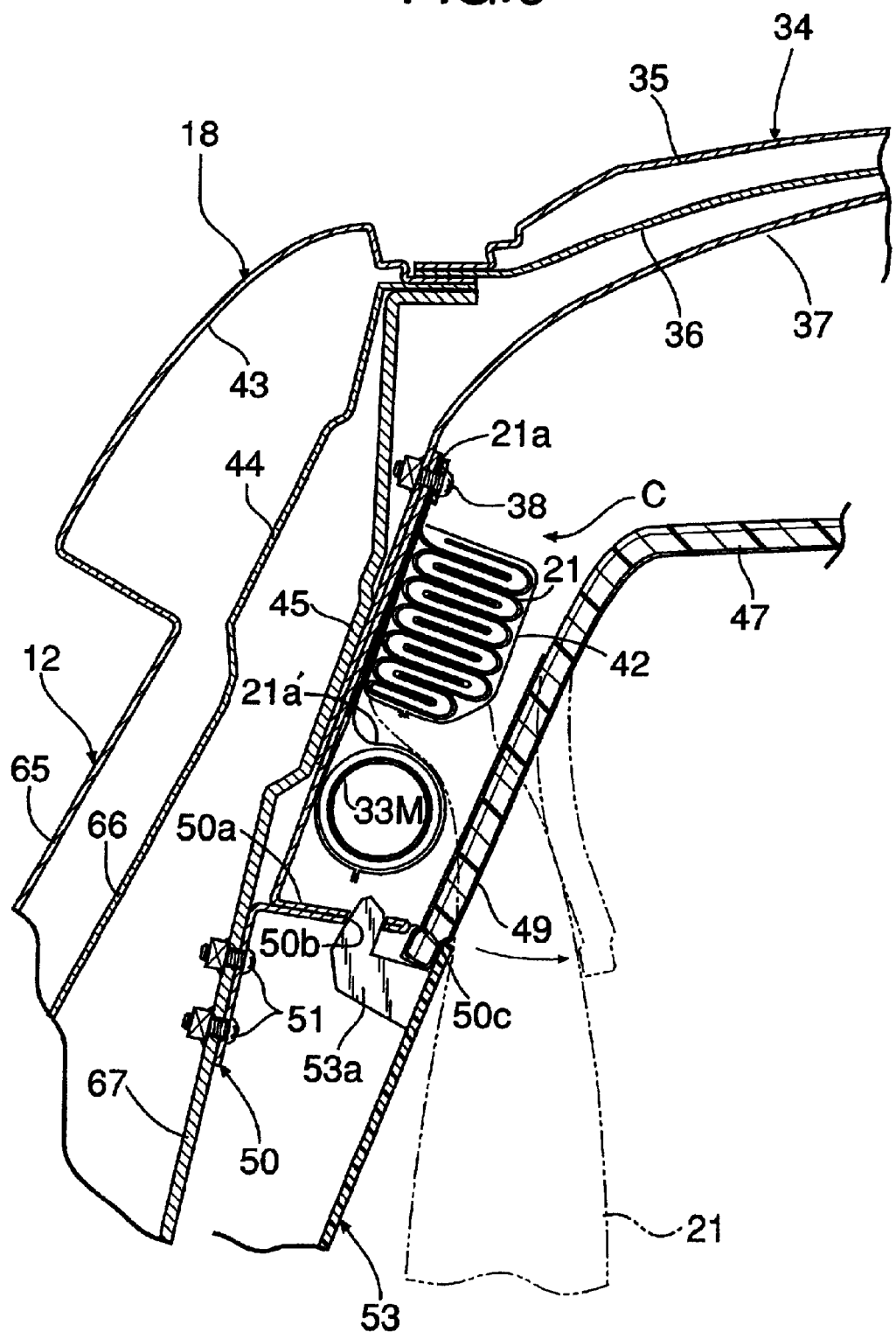

As is clear from FIGS. 4 and 6, the center pillar 12 extending downward from the roof side rail 18 is formed from an outside panel 65, a stiffener 66, and a center pillar inner portion 67. A front bracket 50 is mounted extending from the inner member 37 of the roof 34 to the center pillar inner portion 67 of the center pillar 12. The front bracket 50 is formed by bending a metal sheet; its upper part is superimposed on and, together with the supports 21a and 21a' of the airbag, fixed to the inner member 37 of the roof 34 by means of two bolts 38, and its lower part is fixed to the center pillar inner portion 67 of the center pillar 12 by means of two bolts 51.

Formed in the middle section of the front bracket 50 is a projection 50a projecting toward the occupant compartment, and latches 53a projectingly provided on the inner face of an upper part of the center pillar garnish 53 engage with two latching holes 50b formed in the projection 50a. Formed on the inner face of the center pillar garnish 53 are a large number of impact absorbing ribs (not illustrated) in order to absorb the impact of a secondary collision with an occupant.

The upper part of the center pillar garnish 53 can thereby be fixed to the center pillar 12 without employing a special clip, etc. and, moreover, the center pillar garnish 53 can be fixed more securely in comparison with the case where a clip is employed. The lower edge of the roof garnish 47 is fixedly interposed between the top face 50c of the projection 50a of the front bracket 50 and the inner face at the upper end of the center pillar garnish 53.

Figure 7:
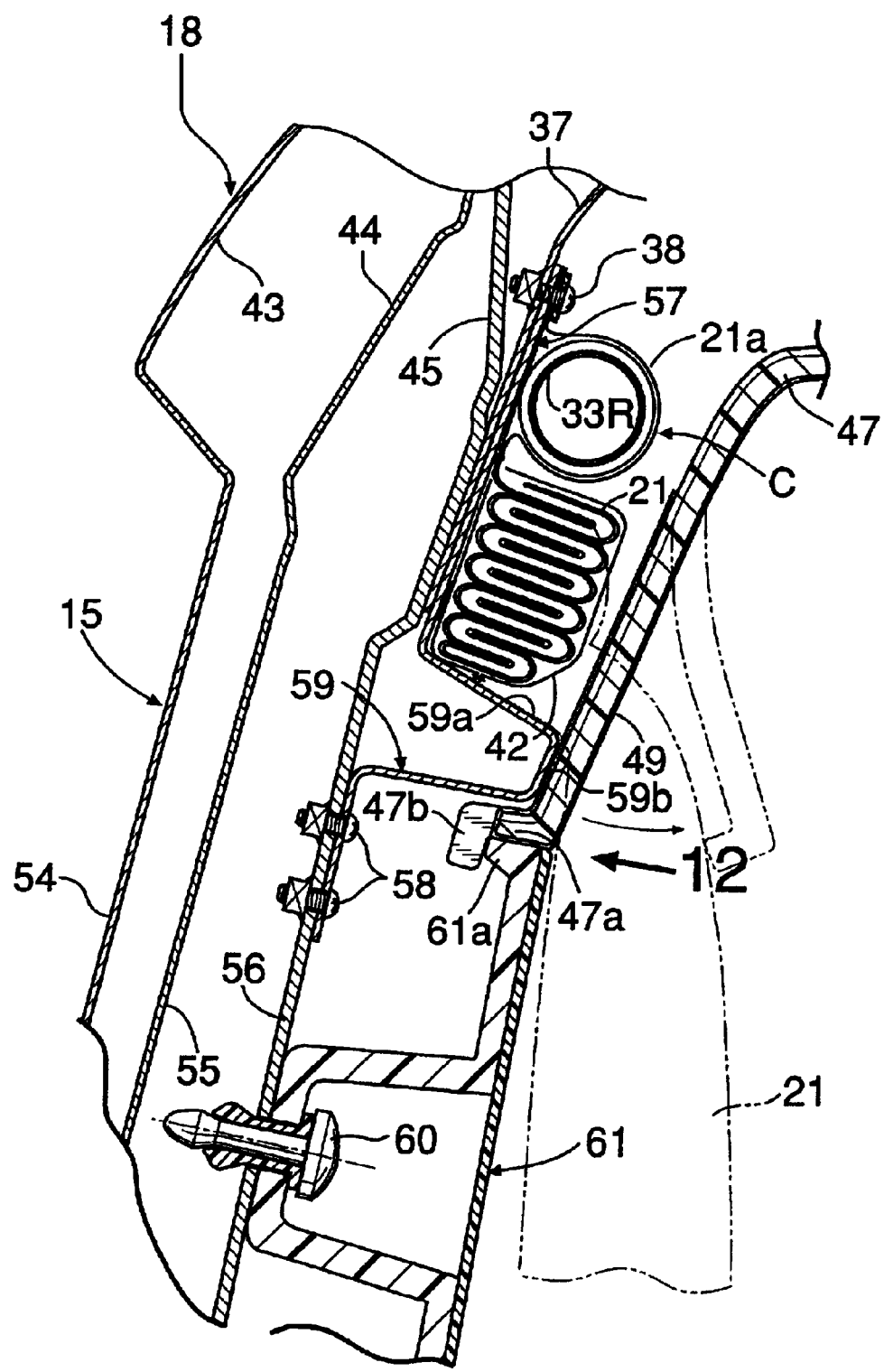
Figure 12:
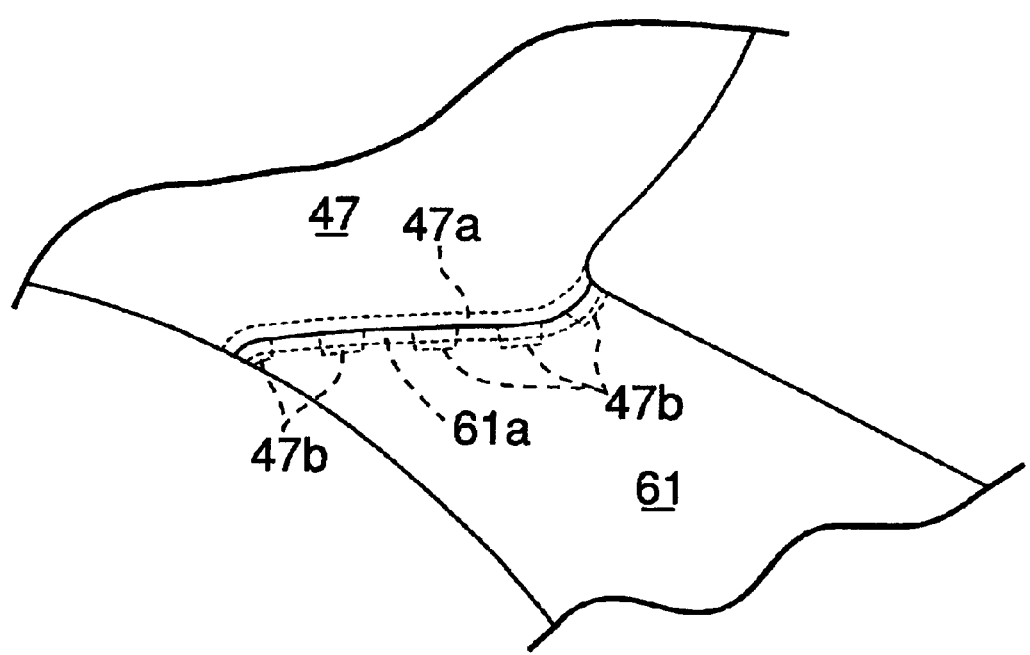

As is clear from FIGS. 4, 7 and 12, the rear pillar 15 extending downward from the roof side rail 18 is formed from an outer member 54, a center member 55, and an inner member 56, and a rear bracket 57 is mounted extending from the inner member 37 of the roof 34 to the inner member 56 of the rear pillar 15. With regard to the rear bracket 57, its upper part is superimposed on and, together with the support 21a of the airbag 21, fixed to the inner member 37 of the roof 34 by means of two bolts 38, and its lower part is fixed to the inner member 56 of the rear pillar 15 by means of two bolts 58. Formed in the middle section of the rear bracket 57 is a projection 59 projecting toward the occupant compartment, and a guide surface 59a formed on the upper face of the projection 59 faces the lower end of the folded airbag 21.

A rear pillar garnish 61 is fixed to the inner member 56 of the rear pillar 15 by means of a clip 60 and has on its upper end a flange 61a bending toward the outside of the vehicle body, and formed on the lower edge of the roof garnish 47 is a flange 47a that abuts the flange 61a of the rear pillar garnish 61. The flange 47a of the roof garnish 47 has a plurality of (five in the embodiment) latches 47b projecting downward, and these latches 47b engage with the reverse face of the flange 61a of the rear pillar garnish 61. Formed on the inner face of the rear pillar garnish 61 are a large number of impact absorbing ribs (not illustrated) in order to absorb the impact of a secondary collision with an occupant.

Figure 8:
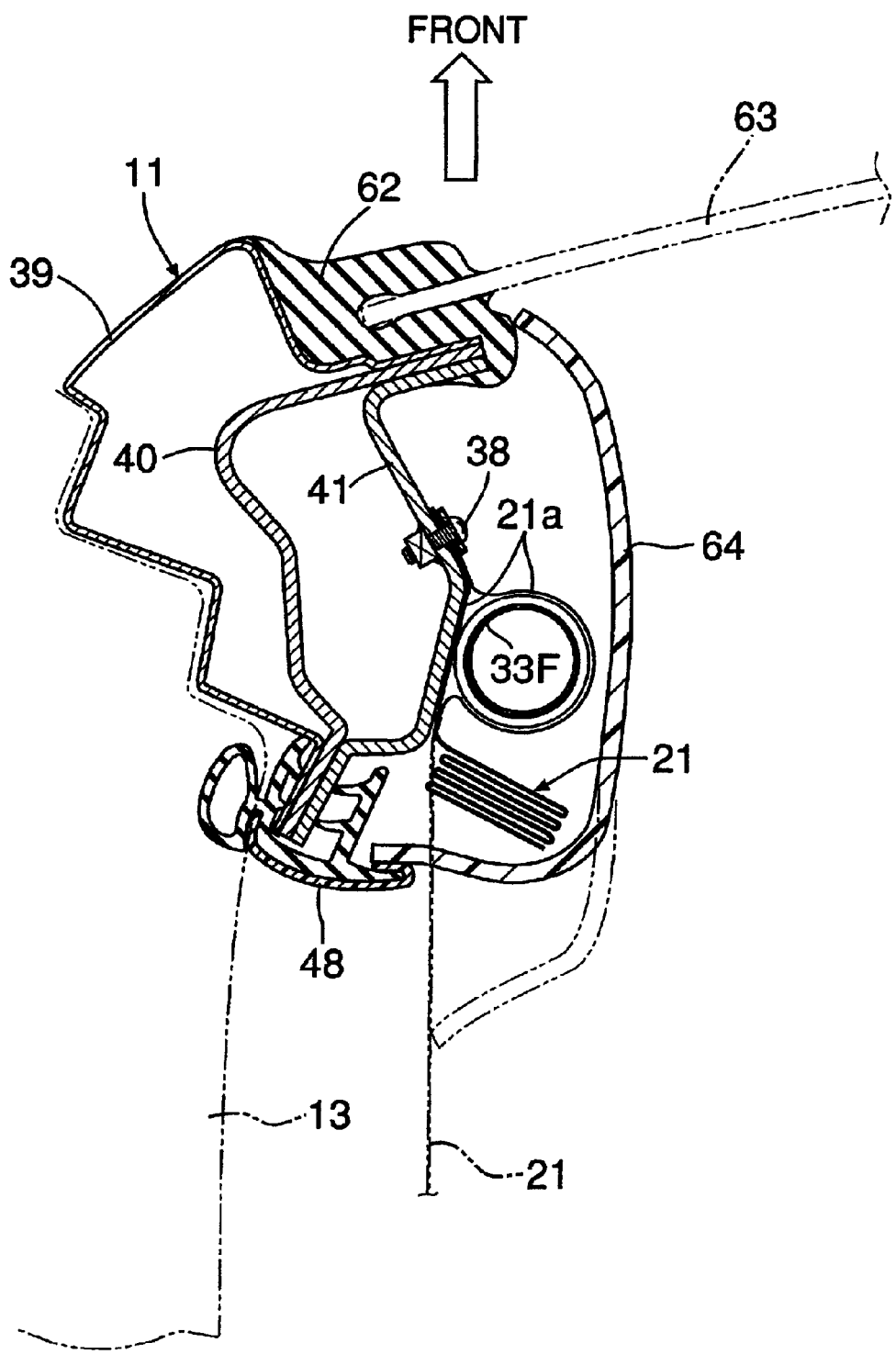
Figure 11:
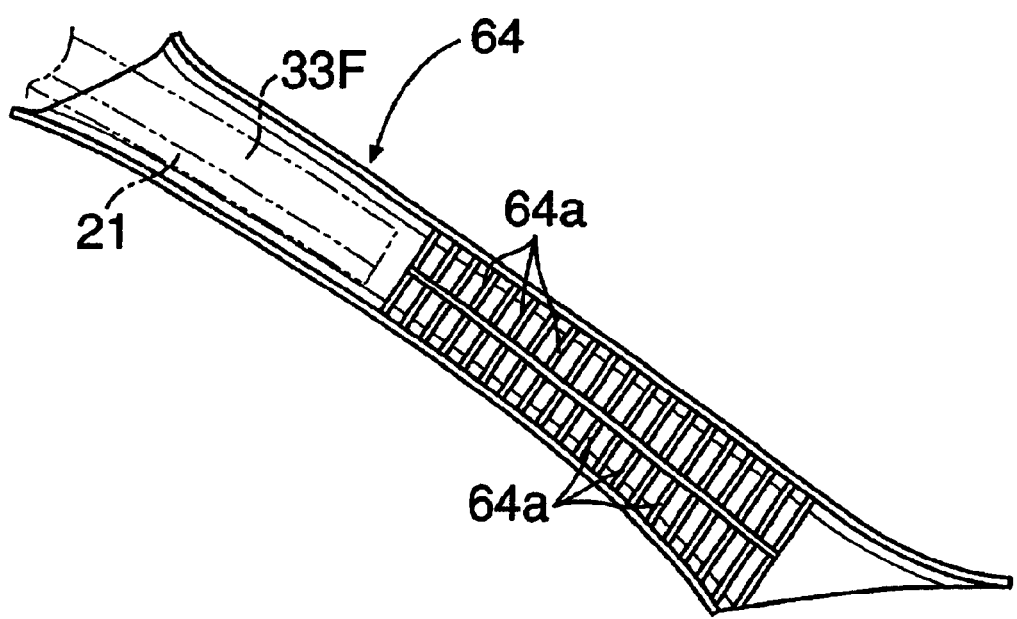

As shown in FIGS. 2, 8 and 11, a side edge of a front glass 63 is supported on the front face of the front pillar 11 via a rubber member 62, and mounted between the rubber member 62 and a weather strip 48 provided on the rear face of the front pillar 11 is a front pillar garnish 64 having an arc-shaped curved cross section. The upper half of the front pillar garnish 64 is hollow, and the folded non-inflatable part 21b on the front end of the airbag 21 and the front end part of the impact absorbing member 33F are housed therewithin. Integrally formed on the inner face of the lower half of the front pillar garnish 64, which houses neither the airbag 21 nor the impact absorbing member 33F, are a large number of impact absorbing ribs 64a for absorbing an impact.

Housing the impact absorbing member 33F within the upper half of the front pillar garnish 64 and forming the large number of impact absorbing ribs 64a in the lower half of the front pillar garnish 64 in this way allows an impact absorbing effect to be exhibited over the whole length of the front pillar 11 while housing the front end part of the airbag 21 within the front pillar 11. Moreover, since no impact absorbing ribs 64a are formed in the upper half of the front pillar garnish 64 housing the front end part of the airbag 21, when the airbag 21 is deployed the front pillar garnish 64 can be easily flexed, thus enabling the airbag 21 to be smoothly deployed and thereby reliably preventing a part of the front pillar garnish 64 from splitting and shattering.

As shown in FIG. 1, a front side-collision sensor 71 and a rear side-collision sensor 72 are connected to an electronic control unit 73, and when the electronic control unit 73 detects a vehicle side collision (or a vehicle rollover) based on signals from the two acceleration sensors 71 and 72, the electronic control unit 73 outputs an operation signal to the inflator 30 so as to deploy the airbag 21.

Next, the action of the above-mentioned embodiment is explained.

When a vehicle side collision is detected, the inflator 30 operates, and the gas stored under pressure within the inflator 30 flows into the thirteen cells 28 via the gas supply pipe 31 and the upper communicating passage 29, thus inflating the thirteen cells 28. Inflating the airbag 21 ruptures the slits 42a of the airbag cover 42, and the airbag 21 whose restraint has been released deploys downward.

As shown in FIG. 5, in the door openings 14 and 17 of the front door 13 and the rear door 16, the lower edge of the roof garnish 47 is pressed downward due to the pressure of the deploying airbag 21, thus releasing the engagement with the weather strip 46, and the airbag 21 deploys downward within the occupant compartment through the opening so formed.

As shown in FIG. 6, at the position of the center pillar 12, the lower edge of the roof garnish 47 is pressed downward due to the pressure of the deploying airbag 21, thus releasing the engagement with the upper end of the center pillar garnish 53, and the airbag 21 deploys downward within the occupant compartment through the opening so formed.

Since the center pillar garnish 53 covering a side face, on the occupant compartment side, of the center pillar 12 is fixed to the front bracket 50 and not to the center pillar 12, even when the upper part of the center pillar 12 is deformed relative to the roof side rail 18 because of a vehicle side collision, there is little change in the positional relationship between the center pillar garnish 53 and the airbag 21 supported in the upper part of the front bracket 50. This arrangement, together with secure fixing of the center pillar garnish 53 to the front bracket 50 by means of the latches 53a rather than by a clip, makes it difficult for the deploying airbag 21 to catch on the upper end of the center pillar garnish 53, thereby guaranteeing reliable deployment of the airbag 21.

Moreover, the disposition of the impact absorbing member 33M at the lower part of the airbag 21 can increase the distance between the airbag 21 and the upper end of the center pillar garnish 53, and the deploying airbag 21 is guided obliquely downward toward the occupant compartment by the impact absorbing member 33M, thereby deploying the airbag 21 yet more smoothly while avoiding any interference with the center pillar garnish 53.

As shown in FIG. 7, at the position of the rear pillar 15, the lower edge of the roof garnish 47 is pressed downward due to the pressure of the deploying airbag 21, thus releasing the engagement with the upper end of the rear pillar garnish 61, and the airbag 21 deploys downward within the occupant compartment through the opening so formed. At this time, since the deploying airbag 21 is guided obliquely downward toward the occupant compartment along the tilted guide surface 59a of the projection 59 of the rear bracket 57, the airbag 21 can be deployed smoothly while avoiding any interference with the rear pillar garnish 61.

Furthermore, since the position of the vicinity of the lower edge of the roof garnish 47 is determined by it being clamped from both sides between the top face 59b of the projection 59 and the flange 61a of the rear pillar garnish 61, the two flanges 47a and 61a abut each other without forming any step, thereby enhancing the appearance. Moreover, since the latches 47b of the roof garnish 47 flex and easily disengage from the flange 61a of the rear pillar garnish 61 when the airbag 21 is being deployed, it is possible to reliably form an opening between the roof garnish 47 and the rear pillar garnish 61, the airbag 21 being deployed through the opening. If the entire lower edge of the roof garnish 47 were engaged with the reverse face of the upper edge of the rear pillar garnish 61, it would become difficult to smoothly separate the lower edge of the roof garnish 47 from the upper edge of the rear pillar garnish 61 when the airbag 21 deploys.

As shown in FIG. 8, at the position of the front pillar 11, the rear edge of the front pillar garnish 64 is pressed downward due to the pressure of the deploying airbag 21, thus releasing the engagement with the weather strip 48, and the airbag 21 deploys downward within the occupant compartment through the opening so formed.

When the acceleration caused by a side collision is equal to or less than a predetermined value, the occupant restraint system C does not operate, but when the impact causes a secondary collision between an occupant and the lower edge of the roof garnish 47 facing the roof side rail 18 or an upper part of the front pillar garnish 64, not only do the corrugated pipe impact absorbing members 33F, 33M and 33R collapse, thus absorbing the impact, but also the folded airbag 21 exhibits a function of enhancing the impact absorbing effect. In this case, since the impact absorbing members 33F, 33M and 33R are supported so as to be in contact with the inner member 37 of the roof 34 and the inner member 41 of the front pillar 11 (see FIGS. 5 to 8), they can be reliably made to collapse by pressure from these inner members 37 and 41, thereby effectively absorbing the impact of the secondary collision.

Although an embodiment of the present invention is explained in detail above, the present invention can be modified in a variety of ways without departing from the spirit and scope of the present invention.

For example, the impact absorbing member 33M is disposed at the lower part of the airbag 21 at the position of the center pillar 12 in the embodiment, but it is also possible for it to be disposed at the lower part of the airbag 21 at the position of the rear pillar 15. Furthermore, the impact absorbing members 33F, 33M and 33R are not limited to a corrugated pipe and can have any structure.

In accordance with the present invention described in claim 1, the impact absorbing members disposed at an upper part of and at the lower part of the folded airbag can protect the head of an occupant from the impact of a secondary collision when the vehicle is involved in a light collision where the airbag does not deploy. Furthermore, since the impact absorbing member is disposed at the lower part of the airbag in the vicinity of the pillar garnish, it is possible to ensure that there is a distance between the airbag and the upper end of the pillar garnish, thus making it difficult for the deploying airbag to catch on the upper end of the pillar garnish and, moreover, the impact absorbing member can guide the deploying airbag toward the occupant compartment, thereby more reliably preventing the airbag from catching on the upper end of the pillar garnish.

What is claimed is:

1. An occupant restraint system for a vehicle, the occupant restraint system comprising:

an airbag for placement in a folded state along an upper edge of a door opening of a vehicle body;

an inflator which generates a gas when the vehicle is involved in a collision, the gas operable to inflate the airbag so that the airbag is deployed in a curtain shape along an inner side face of an occupant compartment; and an impact absorbing member disposed at a lower part of the folded airbag, for placement near a pillar garnish of at least one pillar such that when the airbag is inflated and deployed the impact absorbing member directs the airbag inwardly of said occupant compartment away from said pillar garnish.

2. The occupant restraint system of claim 1, comprising a front impact absorbing member for placement adjacent a front pillar of the vehicle, and a rear impact absorbing member for placement adjacent a rear pillar of the vehicle.

3. The occupant restraint system of claim 2, further comprising a middle impact absorbing member for placement adjacent a middle pillar of the vehicle.

4. The occupant restraint system of claim 1, wherein the impact absorbing member is a corrugated tube.

5. An occupant restraint system for a vehicle, the occupant restraint system comprising:

an airbag for placement in a folded state along an upper edge of a door opening of a vehicle body;

an inflator which generates a gas when the vehicle is involved in a collision, the gas operable to inflate the airbag so that the airbag is deployed in a curtain shape along an inner side face of an occupant compartment; and an impact absorbing member disposed at a lower part of the airbag, for placement near a pillar garnish of at least one pillar;

the impact absorbing member being a corrugated tube; and the impact absorbing member comprising a tubular central core formed from a crushable material, an inner liner disposed within the central core, and an outer cover surrounding the central core.

6. The occupant restraint system of claim 5, wherein the central core is formed from a material comprising aluminum.

7. An occupant restraint system for a vehicle, the occupant restraint system comprising:

an airbag for placement in a folded state along an upper edge of a door opening of a vehicle body;

an inflator which generates a gas when the vehicle is involved in a collision the gas operable to inflate the airbag so that the airbag is deployed in a curtain shape along an inner side face of an occupant compartment; and a front impact absorbing member disposed in operative association with the airbag for placement near a pillar garnish of a front pillar;

a middle impact absorbing member disposed at a lower part of the folded airbag for placement near a pillar garnish of a middle pillar, and a rear impact absorbing member disposed in operative association with the airbag for placement near a pillar garnish of a rear pillar; directs the airbag inwardly of said occupant compartment away from said pillar garnish of the middle piller.

8. The occupant restraint system of claim 7, wherein each of the impact absorbing members is a corrugated tube.

9. An occupant restraint system for a vehicle, the occupant restraint system comprising:

an airbag for placement in a folded state along an upper edge of a door opening of a vehicle body, an inflator which generates a gas when the vehicle is involved in a collision, the gas operable to inflate the airbag so that the airbag is deployed in a curtain shape along an inner side face of an occupant compartment; and a front impact absorbing member disposed in operative association with the airbag for placement near a pillar garnish of a front pillar;

a middle impact absorbing member disposed at a lower part of the airbag for placement near a pillar garnish of a middle pillar; and a rear impact absorbing member disposed in operative association with the airbag for placement near a pillar garnish of a rear pillar;

each of the impact absorbing members comprising a tubular central core formed from a crushable material, an inner liner disposed within the central core, and an outer cover surrounding the ventral core.

10. The occupant restraint system of claim 9, wherein each said central core is fanned from a material comprising aluminum.

* * * * *

UNITED STATES PATENT AND TRADEMARK OFFICE
CERTIFICATE OF CORRECTION

PATENT NO. : 6,796,576 B2
DATED : September 28, 2004
INVENTOR(S) : Aoki et al.

It is certified that error appears in the above-identified patent and that said Letters Patent is hereby corrected as shown below:

Column 8,
Line 28, between "rear pillar;" and "directs the air bag", start a new line, and insert -- wherein when the airbag is inflated and deployed said middle impact absorbing member --.
Line 56, between "surrounding the" and "core", change "ventral" to -- central --.
Line 58, between "ventral core is" and "from a material", change "fanned" to -- formed --.

Signed and Sealed this

First Day of February, 2005

JON W. DUDAS
*Director of the United States Patent and Trademark Office*